(12) United States Patent
Simon et al.

(10) Patent No.: US 11,227,166 B2
(45) Date of Patent: Jan. 18, 2022

(54) METHOD AND DEVICE FOR EVALUATING IMAGES, OPERATING ASSISTANCE METHOD, AND OPERATING DEVICE

(71) Applicant: Robert Bosch GmbH, Stuttgart (DE)

(72) Inventors: Stephan Simon, Sibbesse (DE); Arne Zender, Bad Salzdetfurth (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/645,994

(22) PCT Filed: Sep. 3, 2018

(86) PCT No.: PCT/EP2018/073589
§ 371 (c)(1),
(2) Date: Mar. 10, 2020

(87) PCT Pub. No.: WO2019/057473
PCT Pub. Date: Mar. 28, 2019

(65) Prior Publication Data
US 2020/0202140 A1 Jun. 25, 2020

(30) Foreign Application Priority Data
Sep. 22, 2017 (DE) .......................... 102017216854.4

(51) Int. Cl.
*G06K 9/00* (2006.01)
*G05D 1/02* (2020.01)
*G06K 9/62* (2006.01)

(52) U.S. Cl.
CPC ....... *G06K 9/00791* (2013.01); *G05D 1/0251* (2013.01); *G05D 1/0253* (2013.01); *G06K 9/6267* (2013.01); *G05D 2201/0213* (2013.01)

(58) Field of Classification Search
CPC ............. G06K 9/00791; G06K 9/6267; G05D 1/0251; G05D 1/0253; G05D 2201/0213
See application file for complete search history.

(56) References Cited

U.S. PATENT DOCUMENTS

2010/0097457 A1* 4/2010 Zhang ................ G06K 9/00798
348/119
2010/0135544 A1* 6/2010 Mattiuzzi .................. G06T 7/33
382/128

(Continued)

FOREIGN PATENT DOCUMENTS

WO 2004059900 A2 7/2004
WO 2016109876 A1 7/2016

OTHER PUBLICATIONS

International Search Report for PCT/EP2018/073589, dated Oct. 29, 2018.

(Continued)

*Primary Examiner* — Ping Y Hsieh
*Assistant Examiner* — Xiao Liu
(74) *Attorney, Agent, or Firm* — Norton Rose Fulbright US LLP; Gerard A. Messina

(57) ABSTRACT

A method for evaluating images and in particular for evaluating correspondences of images. The method includes (i) providing correspondences between given first and second images, (ii) providing a quality measure or a plurality of quality measures as attributes for characterizing a particular correspondence, (iii) evaluating and conditionally selecting the correspondences, (iv) providing selected correspondences as an evaluation result, the evaluation of correspondences being based on a combination of attributes and the selection of correspondences being based on a result of the evaluation.

12 Claims, 9 Drawing Sheets

(56) References Cited

U.S. PATENT DOCUMENTS

| | | | |
|---|---|---|---|
| 2010/0166323 A1* | 7/2010 | Zhao | G06T 7/33 |
| | | | 382/218 |
| 2014/0313303 A1* | 10/2014 | Davis | A61B 5/0077 |
| | | | 348/77 |
| 2016/0239950 A1* | 8/2016 | Miyasa | G06K 9/6211 |
| 2016/0267325 A1 | 9/2016 | Sundaresan et al. | |

OTHER PUBLICATIONS

Yamaguchi K. et al,. "Vehicle Ego-Motion Estimation and Moving Object Detection Using a Monocular Camera," IEEE 2006, 18th, International Conference on Pattern Recognition, IEEE Comput. Soc; 2006, pp. 20-24.

"The Kitti Vision Benchmark Suite" Under http://www.cvlibs.net/datasets/kitti, Donwloaded on Feb. 27, 2020.

\* cited by examiner

METHOD AND DEVICE FOR EVALUATING IMAGES, OPERATING ASSISTANCE METHOD, AND OPERATING DEVICE

FIELD

The present invention relates to a method and a device for evaluating images and in particular correspondences of images, an operating assistance method and in particular a driving assistance method, and an operating device and in particular a vehicle. The present invention furthermore relates to a computer program and a machine-readable storage medium.

BACKGROUND INFORMATION

In many technical fields, image processing is used to control devices and processes, for example, also in the field of the automotive industry in so-called driver assistance systems. In this context, for example, images are recorded and a control process is based thereon. For this purpose, the images have to be evaluated. During the image evaluation, so-called correspondences are frequently generated and the evaluation is based thereon. Such correspondences describe, pixel by pixel and in temporal and/or spatial orientation, associations between coordinates in a first image and coordinates in a second image. A temporal relationship may involve sequentially recorded images, a spatial relationship may involve spatially separated images, which may also be recorded simultaneously, for example, in the case of stereo vision.

SUMMARY

An example method according to the present invention for evaluating images may have the advantage that, with comparatively little effort, correspondences for a pair of images may be checked with high reliability and may be selected upon verification. This may achieved according to the example embodiment of the present invention in that a method for evaluating images and in particular for evaluating correspondences of images is provided, which includes the following steps:

(i) providing correspondences between given first and second images,
(ii) providing one or a plurality of quality measures as attributes for characterizing a particular correspondence,
(iii) evaluating and conditionally selecting the correspondences, and
(iv) providing selected correspondences as an evaluation result.

According to the present invention, the evaluation of correspondences is based on a combination of attributes and the selection of correspondences is based on a result of the evaluation. Due to the measures provided according to the present invention, a high level of selectivity and accuracy is achieved in ascertained correspondences because of the use of attributes combined with one another for the correspondences during the evaluation upon the selection of the correspondences. Due to the selection, the data volume may be reduced without accuracy losses during the further processing or further use.

In the context of the present invention, the entirety of the correspondences may also be understood as a correspondence image, set, or matrix, whose individual components are also referred to as elements or pixels. The individual correspondences may include one or also multiple scalar component(s), for example, values for various movement directions u, v in space. They may thus be vector-valued. Furthermore, the correspondences may be based on the concept of the optical flow, also referred to as OF, and/or may reflect a stereo disparity, however, this is not mandatory.

Similarly, the entirety of the quality measures, attributes, and/or selected correspondences may be understood as images, data sets, and/or matrices including corresponding elements or pixels.

The present invention is applicable in conjunction with any type of camera, monitoring camera, and/or metrological camera, for example—but not only—on or in vehicles in general, in particular in conjunction with motor vehicles. This also encompasses applications of the present invention in conjunction with television cameras, consumer cameras, drone cameras, human-machine interaction cameras, etc.

Preferred refinements of the present invention are described herein.

Greatly varying aspects which enable an evaluation of correspondences may be used individually or in any desired combination with one another to implement the particular quality measures or attributes for particular observed correspondences.

It is thus possible according to one preferred embodiment of the method according to the present invention that a particular quality measure as an attribute of an observed correspondence is representative of at least one of the following aspects or a combination thereof, i.e., for example for a measure of an—at least local—location dependence and/or solid angle dependence of the distribution of the correspondences at least in the area of a particular observed correspondence and in particular for a measure of the uniformity of a location-dependent and/or solid-angle-dependent distribution of the correspondences, for a measure of a priority for the preferred consideration of an underlying correspondence, for a measure of the presence of a correct association of a particular correspondence with areas of the underlying images, for a measure of a proper motion of the areas related to the particular correspondence of the underlying images, in particular an object related thereto and/or in consideration of non-epipolar compliant movements, for a measure of a movement possibility of the areas related to the particular correspondence of the underlying images, in particular an object related thereto, for a measure of an accuracy with which a particular correspondence was determined, for a measure of an underlying resolution or resolution step in the ascertainment of the particular correspondence, for a measure of an association of the areas related to the particular correspondence of the underlying images, in particular an object related thereto, with a semantic class, preferably on the basis of a video-based object classification, a procedure of machine learning, and/or a procedure of semantic segmenting, for a measure of an association of the areas related to the particular correspondence of the underlying images, in particular an object related thereto, with a class for the consideration of permitted areas of the underlying images, in particular in conjunction with masking, for a measure of the clarity with which a particular correspondence is or was ascertained in local surroundings, for a measure of the consistency of a particular correspondence with a temporally preceding correspondence, in particular with regard to a measure of consistency of flow vectors over time, upon confirmed consistency, an underlying temporally stable behavior being specified as a numeric value, in particular in the form of an age.

A particularly high level of flexibility results in another advantageous embodiment of the method according to the present invention in that combined quality measures are used as attributes which are derived from one or a plurality of quality measure(s) by combination formation and/or function formation, in particular by reciprocal value formation, sign reversal, rounding, formation of function values of scalar or vectorial values on which the quality measures are based.

The specific sequence of the method according to the present invention may be designed particularly simply if, according to another advantageous refinement of the method according to the present invention, a particular attribute and/or underlying quality measure and in particular their values are coded for use as addresses, in particular in conjunction with a readout table, and in particular a lookup table, representing values of the attributes and/or the quality measures.

Additionally or alternatively, further simplifying and economizing of the method according to the present invention results if, according to another specific embodiment, a particular correspondence is represented as a one-dimensional list or as a vector and an attribute and/or its coding associated with the particular correspondence is represented as one or multiple additional list elements or vector components or as parts thereof and is/are appended to the list or the vector.

In specific applications, all values of the quality measures and/or attributes to be considered are possibly not available at the point in time of the derivation of the correspondences.

It is also advantageous in conjunction with such situations if attributes and/or quality measures for correspondences of an earlier point in time are transferred and/or extrapolated to a correspondence at a later point in time.

The method according to the present invention may be further economized according to another advantageous embodiment in that the correspondences, in particular in combination with the associated attributes in their entirety, are actually represented as an image, matrix, or the like, the image or the matrix is covered by overlapping and/or non-overlapping partial regions—in particular like a tessellation or tiling—and a best correspondence—in particular with regard to the associated attributes—is selected for each partial region with respect to the correspondences present in the partial region—if present.

The present invention furthermore relates to an operating assistance method and in particular a driving assistance method for a device and in particular for a vehicle, in which images are recorded and evaluated using a method as per a method according to the present invention and in which a result of the evaluation is used in the control of the operation of the device.

According to another aspect of the present invention, an example device for evaluating images and in particular for evaluating correspondences of images is also provided, which is designed to execute an operating assistance method or driving assistance method according to the present invention or a method according to the present invention for evaluating images and in particular correspondences of image pairs.

The example device according to the present invention may be designed in particular as an ASIC, as a freely programmable digital signal processing device, or as a combination thereof.

Furthermore, an example computer program is provided by the present invention, which is configured to execute a method according to the present invention when it is executed on a computer or a digital signal processing unit.

Furthermore, the present invention also provides a machine-readable storage medium on which the computer program according to the present invention is stored.

BRIEF DESCRIPTION OF THE DRAWINGS

Specific embodiments of the present invention are described in detail with reference to the figures.

DETAILED DESCRIPTION OF EXAMPLE EMBODIMENTS

Figure 1:
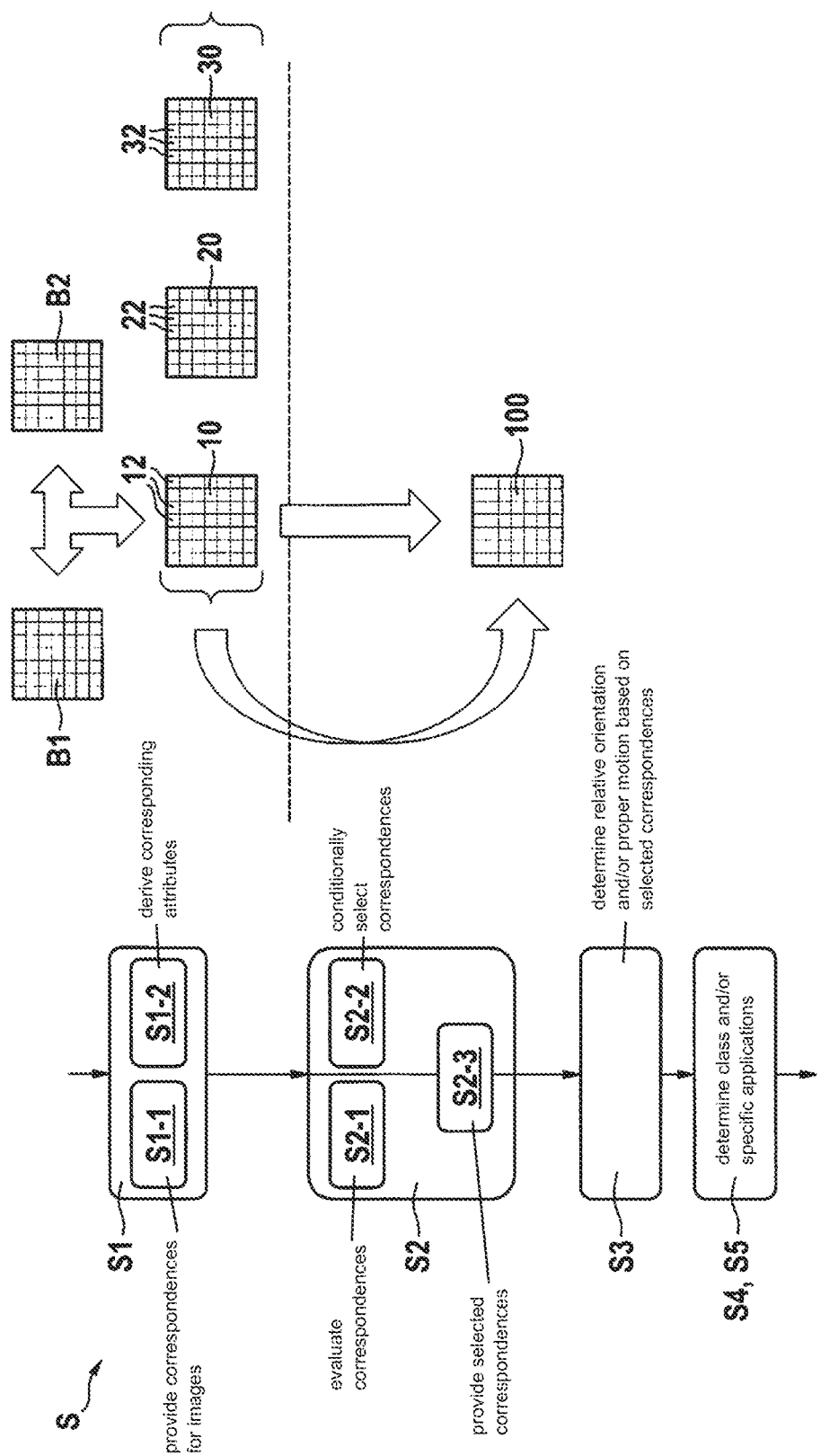
FIGS. 1 and 2 schematically show, in the form of a flow chart or as a block diagram, specific embodiments of the method according to the present invention and illustrate the relationships between the underlying images and correspondences, attributes, and further pieces of information.

Exemplary embodiments of the present invention and the technical background are described in detail hereafter with reference to FIGS. 1 through 9C. Identical and equivalent and also identically or equivalently acting elements and components are identified by the same reference numerals. The detailed description of the identified elements and components is not reproduced every time they appear.

The illustrated features and further properties may be isolated from one another in arbitrary form and combined with one another as desired, without departing from the core concept of the present invention.

Figure 2:
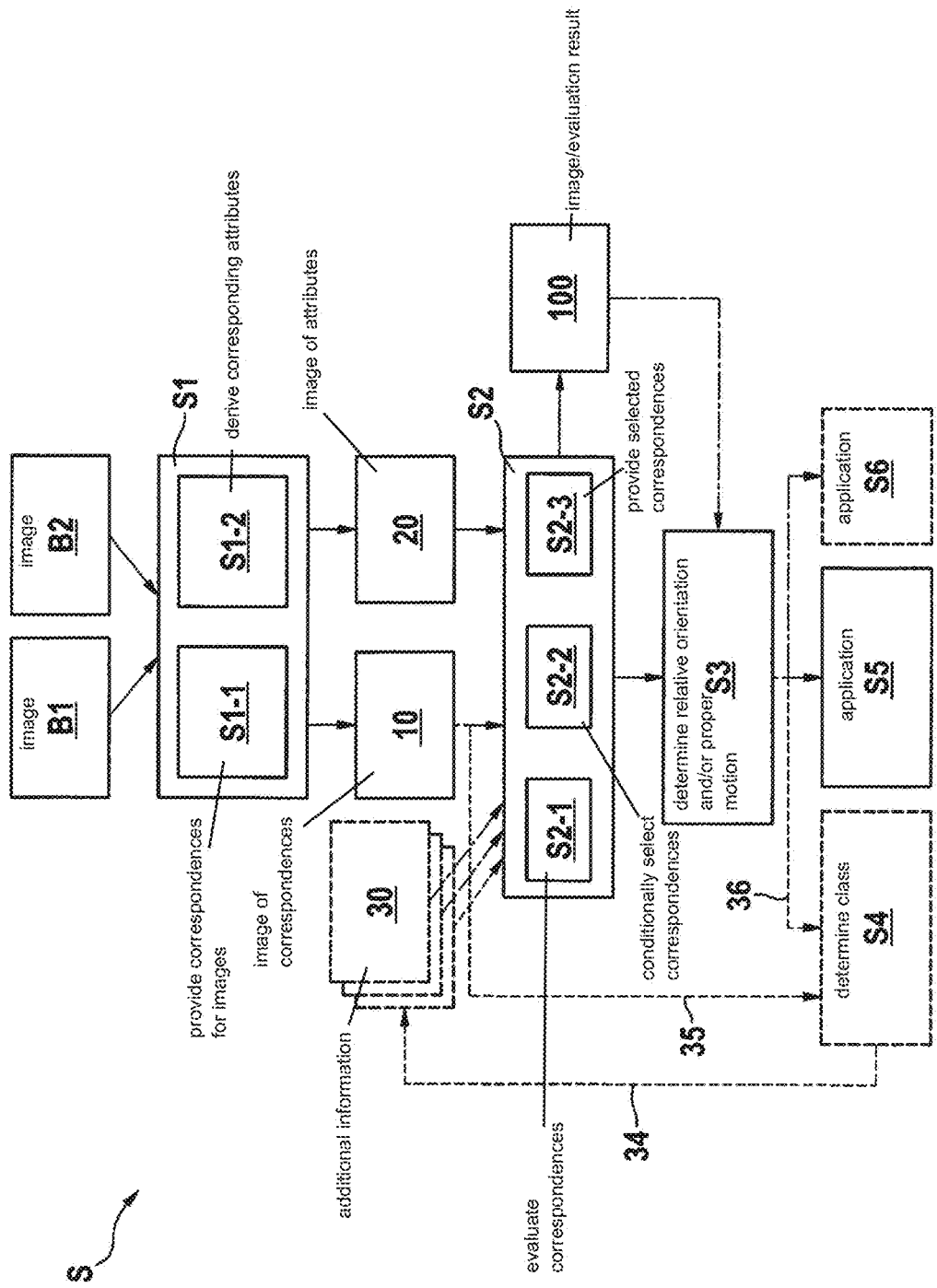

FIGS. 1 and 2 schematically show, in the form of a flow chart or as a block diagram, specific embodiments of method S according to the present invention and illustrate the relationships between underlying images B1, B2 and correspondences 12, attributes 22, and further pieces of information 32, which are provided here corresponding to underlying images B1, B2 as corresponding images or matrices 10, 20, and 30 including corresponding pixels or elements.

Images B1, B2, 10, 20, 30 may have sizes and/or formats differing from one another or may also have one size. Attribute images may in particular also be smaller to save storage space and/or bandwidth. In particular, they may be half as large horizontally and vertically as the input images and may be scaled up as needed.

The specific embodiment of method S according to the present invention for evaluating images B1, B2 and in particular their correspondences 12 includes a first step S1, in which, in a first partial step S1-1, correspondences 12 for images B1, B2 are provided as such, for example, in the form of an equivalent corresponding image 10 of correspondences 12, which may also be understood as a set, matrix, or memory area. In this context, individual correspondences 12 are also understood as elements or pixels.

In a second partial step S1-2, corresponding attributes 22, for example, in the form of quality measures, are derived and provided on the basis of an analysis of correspondences 12. The entirety of attributes 22 may again be understood as an image 20, set, matrix, or memory area, individual attributes 22 again being included as elements or pixels.

Additional pieces of information 32 are optionally generated and provided, either additionally to the attributes, for example, contained therein, or as a separate entity, in the form of an image 30, a set, a matrix, or a memory area. However, this is not mandatory, but is often advantageous.

Individual partial steps S1-1 and S1-2 of first method step S1 of method S may be executed in parallel and, for example, simultaneously or in series.

In a second step S2 of method S according to the present invention, the steps take place of evaluating S2-1 correspondences 12, conditionally selecting S2-2 correspondences 12, and providing S2-3 selected correspondences 12 as the evaluation result.

FIG. 1 shows that selected correspondences 12 are again provided in the form of an image 100, image 100 also being able to be understood as a set, matrix, or memory area. However, this procedure is not mandatory.

If the selected correspondences only represent a small fraction of the input volume of correspondences, it may be very advantageous to no longer represent the selection as an image or matrix, but rather more compactly, for example, as a list.

Step S3 of the determination of a relative orientation and/or a proper motion on the basis of selected correspondences 12 follows. The data volume may be reduced and the reliability and the accuracy may be increased due to the selection.

Various other processes may follow on the basis of the ascertained relative orientation and/or the proper motion, for example, a procedure S4 of the determination of the class of the properly motioned objects or the like and alternatively or additionally specific applications S5, S6.

FIG. 2 shows a view as a block diagram, which provides more detailed information about the dataflow, in particular with regard to the influence of data streams 35 and 36, namely the stream of correspondences 12 and the data on the proper motion and/or the relative orientation with regard to the classification of properly motioned objects according to method step S4 and its influence about feedback 34 on second method step S2 of method S and in particular procedure S2-2 of the conditional selection, specifically within the sense of supplying additional pieces of information 30.

Figure 3:
FIGS. 3 through 5 show schematic results of the application of one specific embodiment of the method according to the present invention on the basis of corresponding images of correspondence distributions.
Figure 4:
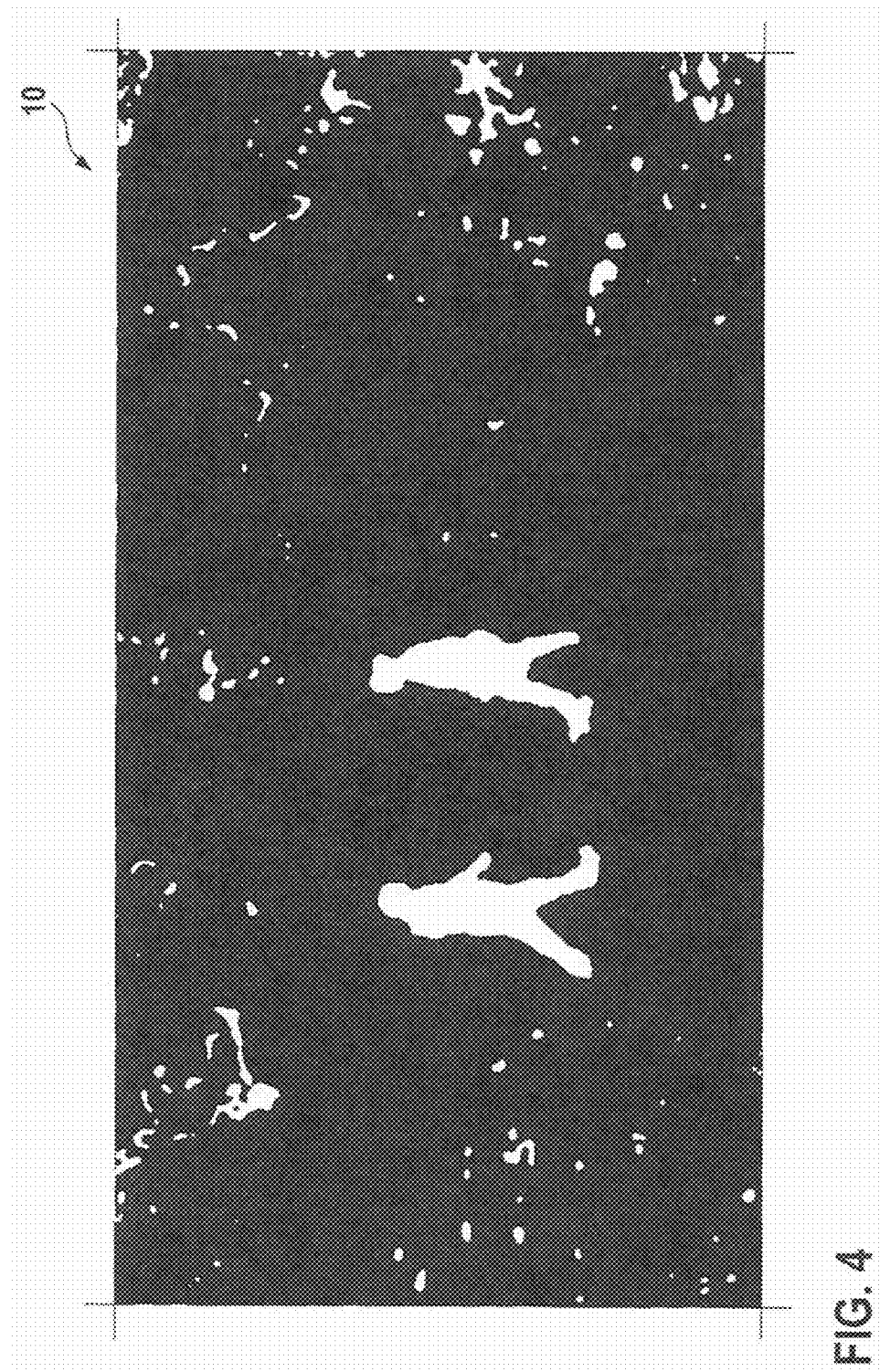
Figure 5:
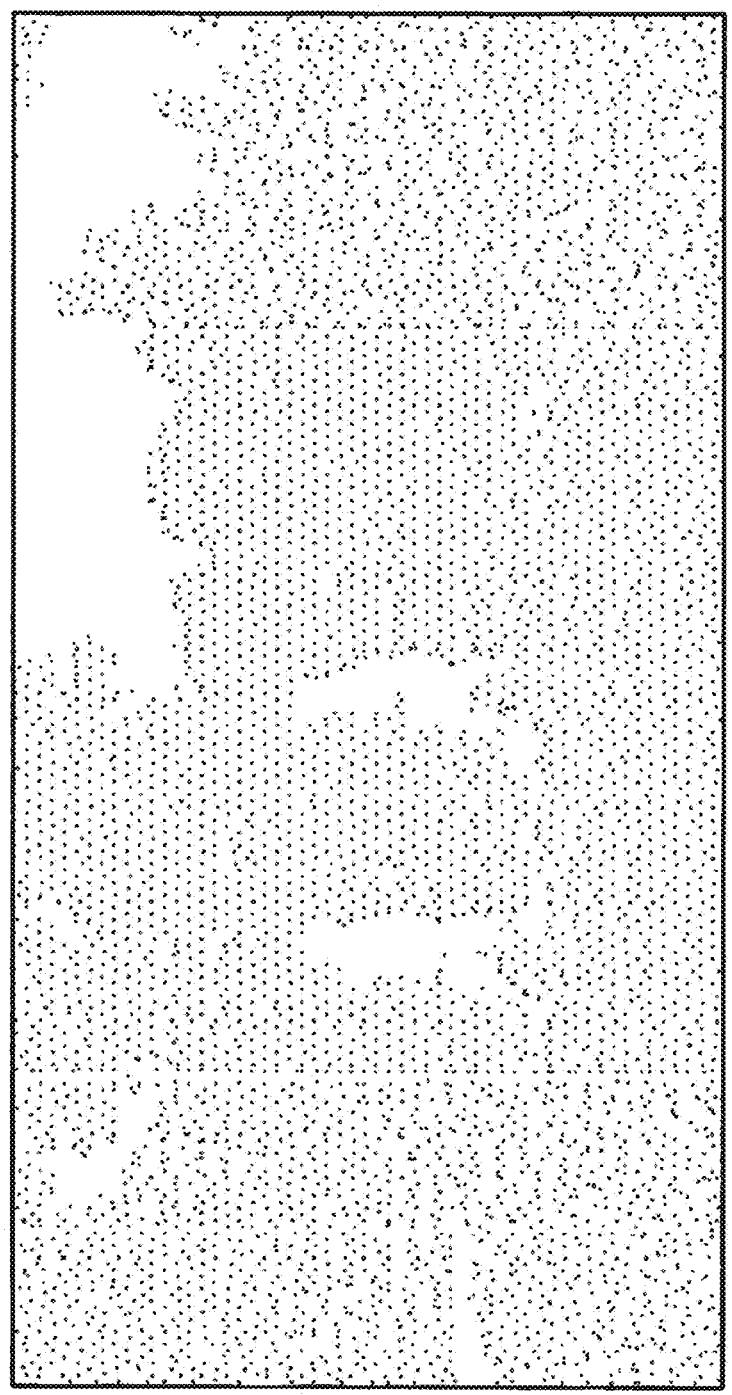

FIGS. 3 through 5 show schematic results of the application of one specific embodiment of method S according to the present invention on the basis of corresponding images 10, 100 of correspondence distributions, specifically in the original form of correspondences 12 in FIG. 3, in a masked form of correspondences 12 in FIG. 4, and after selection of correspondences 12 in FIG. 5. This is explained in greater detail in sections following hereafter.

Figure 6:
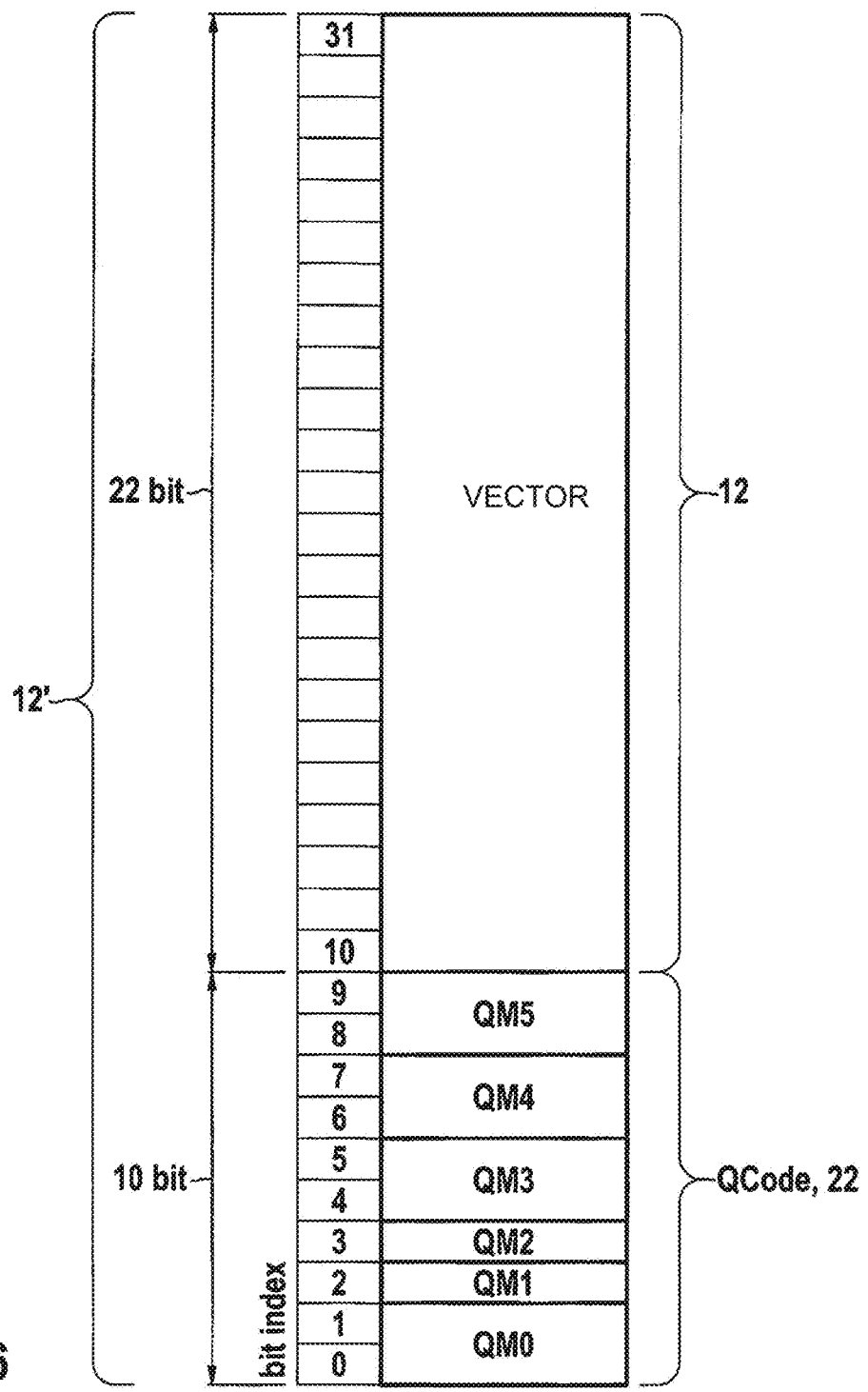
FIG. 6 schematically shows a possible structure of the representation of a flow vector as a correspondence with appended attributes.

FIG. 6 schematically shows a possible structure of the representation of a flow vector, for example, in a word having a length of 32 bits, as a correspondence 12 having appended attribute 22 as a separate code section, which is also referred to in this context as a QCode and includes sections for 6 quality features QM0 through QM5. In this context, original correspondence 12 is shown modified by appending attribute 22 to form a modified correspondence 12'.

Figure 7:
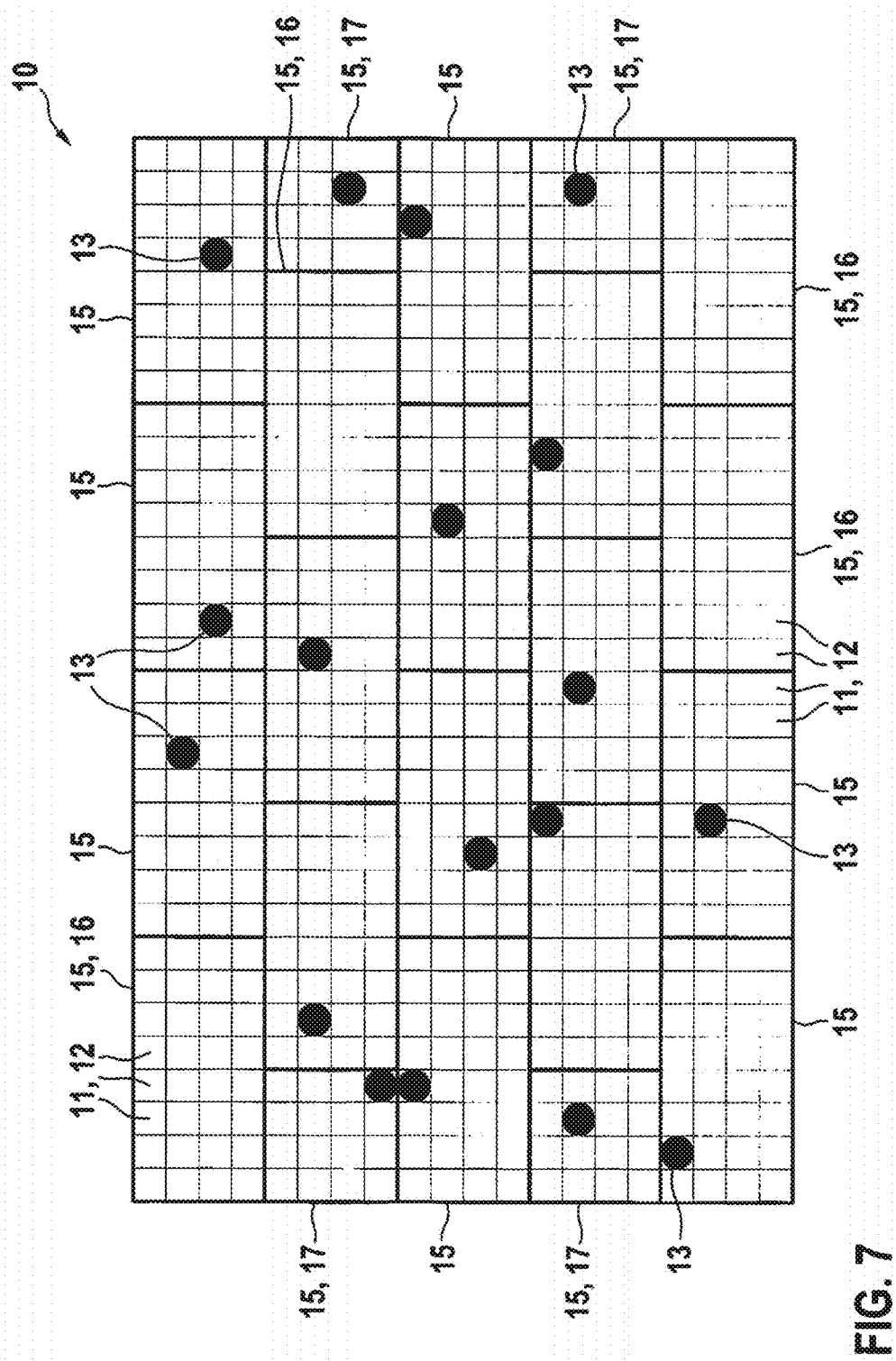
FIGS. 7 and 8 schematically show the application of a tessellation or tiling to cover an image of correspondences.
Figure 8:
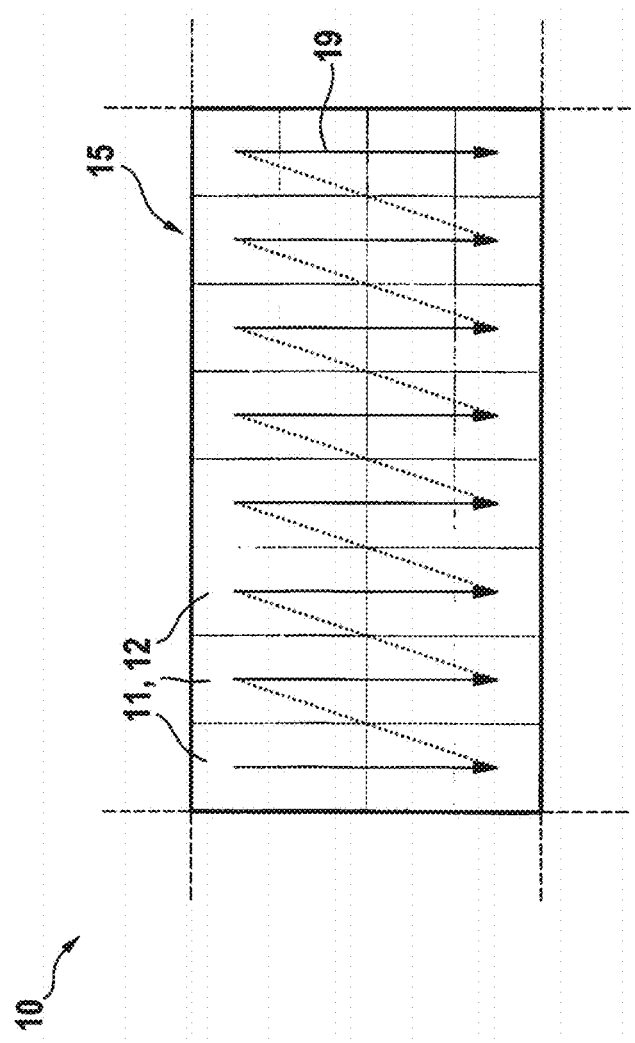

FIGS. 7 and 8 schematically show the application of a tessellation or tiling to cover an image 10 of correspondences 12.

The entirety of all provided correspondences 12 is shown as a correspondence matrix 10 in FIG. 7 and may also be understood as an image, which corresponds in its design and structure to corresponding underlying images B1 and B2. However, this procedure is not mandatory, matrix 10 and images B1, B2 may have different sizes in comparison to one another. Accordingly, corresponding elements or pixels 11 are formed in image or matrix 10, which may, but do not have to, contain one or multiple correspondence(s) 12, i.e., specific pixels 11 may be empty if they do not contain a correspondence 12.

A tessellation or tiling is produced using partial areas or partial regions 15 to cover correspondence matrix 10 with original correspondences 12. Individual partial areas or partial regions 15 do not overlap and in their entirety cover entire correspondence image 10.

Specific partial regions 16 do not include a correspondence 12. Specific partial regions 17 are shaped differently in the illustration according to FIG. 7 and have different dimensions, because they are located at the margin and ensure an offset of partial regions 15 in relation to one another.

A preferred correspondence 13 is determined and selected for each of partial regions 15, if it is not empty, by a comparison of all correspondences 12 within particular partial region 15. This is discussed again in detail in the sections hereafter.

FIG. 8 considers a single tile 15 of the coverage of correspondence matrix 10, the course of arrows 19 showing the path of the processing of tiles 15 with respect to individual pixels 11 and individual correspondences 12. The path of the processing ensures that all pixels 11 of tiles or partial regions 15 are reached. The path of the processing of tiles or partial regions 15 may also be selected differently, for example, preferably horizontal instead of vertical, spiral-shaped, or in random sequence.

Figure 9A:
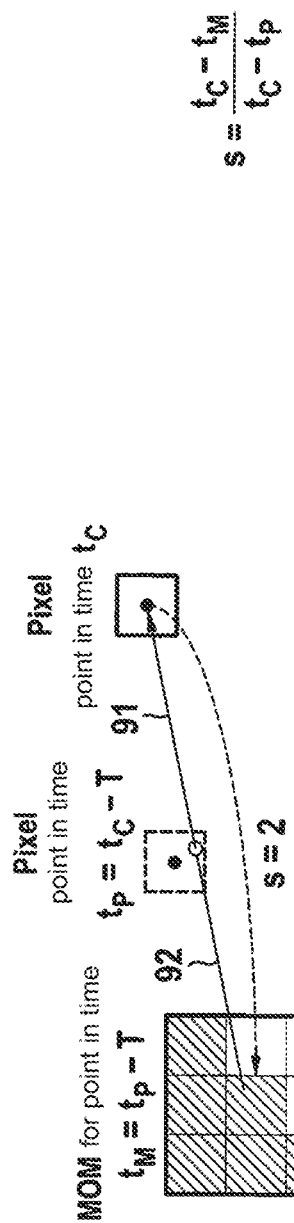
FIGS. 9A through 9C schematically describe the application of a mask and a temporal transfer in this regard.
Figure 9B:
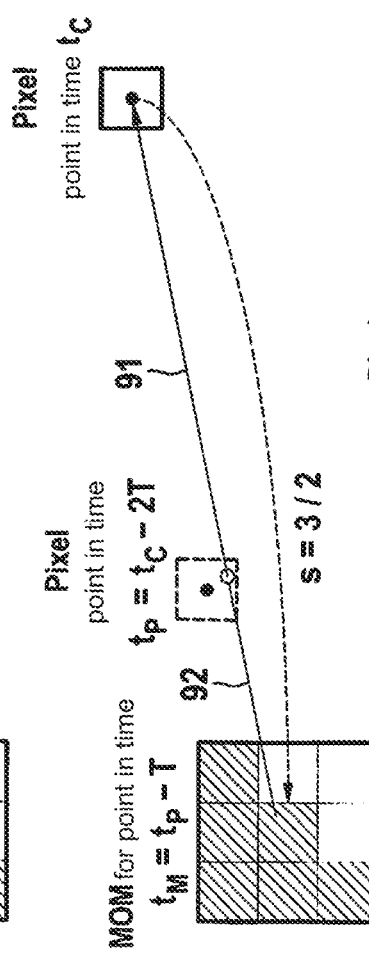
Figure 9C:
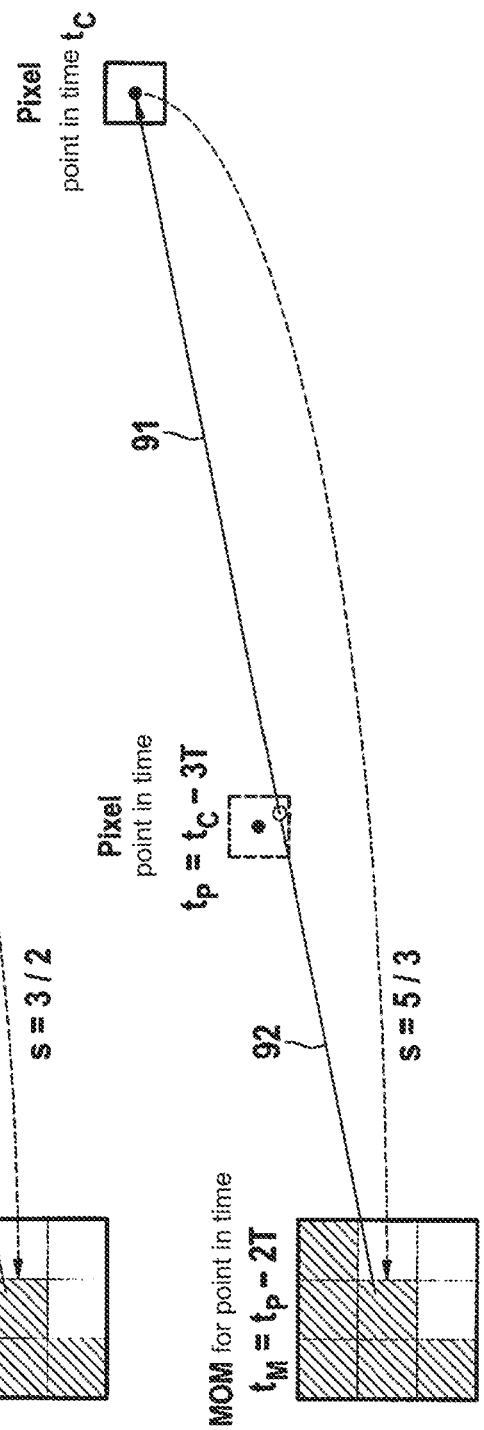

FIGS. 9A through 9C schematically describe the application of a mask and a temporal transfer in this regard in the sense of a warping. These aspects are described in detail hereafter in further sections.

These and further features and properties of the present invention are explained further on the basis of the following descriptions:

The present invention relates, inter alia, to so-called priority sampling and alternatively or additionally to aspects of the evaluation and selection of preferred candidates from a set or a field of correspondences 12 for image pairs B1, B2 or generally for a plurality of images B1, B2.

According to an alternative way of considering the present invention, it also relates to the evaluation and selection of correspondences 12 for image pairs B1, B2 or generally for a plurality of images B1, B2 and/or aspects of the improvement of camera-based estimations of the relative orientation.

Furthermore, according to another additional alternative way of considering the present invention, it relates to aspects of methods and devices for improving video-based proper motion estimations.

The theme of correspondence formation is encountered in the field of machine vision, computer vision, in particular in conjunction with the concept of optical flow (OF), and in the case of stereo disparity.

In conjunction with the optical flow, correspondences are formed in the temporal direction by associations being determined between coordinates in a first image B1 and coordinates in a second image B2. Such a correspondence specifies how the projection of a point in the 3D scene has moved further in the 2D image from an old coordinate to a new coordinate.

The movement in images B1, B2 may be induced by the movement of the scene point or by the movement of the camera, or both at the same time.

In the case of stereo vision, the two images B1, B2 are recorded approximately at the same time by two cameras, which are located at different locations. The relative arrangement of the cameras is generally fixed and known. The correspondence formation enables the determination of the distance to the point in the 3D scene with the aid of triangulation.

For example, "The KITTI Vision Benchmark Suite" (Non Patent Literature) gives an overview of the best methods in the related art, in particular with respect to driver assistance systems.

In the case of a camera-based determination of the relative orientation, a plurality of correspondences and in particular of point correspondences between two images B1, B2 is used to compute therefrom the relative orientation of the camera positions in relation to the scene—often assumed to be static.

Images B1, B2 may also originate from two different cameras, which may be connected to one another in a mechanically fixed manner.

If the two images B1, B2 originate from the same camera, reference is also made to a proper motion estimation. The relative movement—in particular in relation to the scene—is ascertained which the camera has completed in the intermediate time. This movement may generally be described as a combination of a 3D rotation and a 3D translation.

Within the context of the present invention, aspects of proper motion estimation or determination S3 and/or aspects of estimation or determination S3 of a relative orientation, which also include the multi-camera case, are treated as equivalent and—in particular if they are mentioned in isolation—solely by way of example in each case. All technical aspects which are explained in conjunction with a proper motion estimation are also advantageously applicable to the same extent to technical aspects of the estimation of a relative orientation and in particular with regard to a multi-camera case.

The present invention is also concerned in particular with a theme of selection S2-2 of a preferable suitable and in particular optimal subset of correspondences from the entirety of all derived correspondences.

Such a choice or selection may be, for example, reasonable or necessary if one or multiple of the following circumstance(s) exists:

A subsequent method step or algorithm, for example, an image evaluation and/or image processing, does not have sufficient capacity to process the entirety of all provided correspondences, in particular in real time.

In the entirety of all provided correspondences, there are unsuitable correspondences which would better be filtered out before the further processing.

Examples of this case are:

flawed correspondences, i.e., for example, incorrect associations and correspondences between points of the scene which are associated with properly motioned objects, i.e., are not associated with the part of the scene to which the determination of the relative orientation is to relate. Examples of properly motioned objects are pedestrians, moving cars, drifting clouds, reflections on reflective surfaces.

The correspondences were ascertained with differing accuracy. The correspondences having higher accuracy would then be preferred.

The correspondences are distributed unevenly in the image or in space. The selection could then improve the uniformity. This is because it is advantageous for the determination of the relative orientation if the correspondences originate from different spatial directions.

According to the present invention the option is provided of placing requirements—for example, within the context of quality criteria—on the selection and selecting of those correspondences which fulfill or even best fulfill these requirements.

Various classes of quality criteria may be used in conjunction with the present invention:

(1) For example, a measure may be ascertained that permits a statement regarding how unambiguously a correspondence 12 could be ascertained in local surroundings. For example, it may be ascertained if the correspondence may be ambiguous along an edge or due to periodic structures. The measure of the unambiguousness may be coded as a numeric value.

(2) Alternatively or additionally, a correspondence may be compared in each case to its temporally preceding correspondence and checked for consistency of the flow vectors over time. Temporally stable behavior exists if consistency is confirmed. If this consistency is fulfilled again and again, the level of confidence thus increases, which may be specified, for example, as a numeric value in the form of an age.

The example method according to the present invention may be used in existing or coming generations of driver assistance systems—for example, as an implementation in an ASIC—to select the best candidates for a proper motion estimation from correspondences with respect to the optical flow.

In addition to the two above-mentioned quality criteria (1) and (2), further quality criteria may be used, for example, also the quality criteria described hereafter. All quality criteria may be used individually or in any desired combination with one another to carry out a choice or selection S2-2 of already derived correspondences.

This is explained hereafter on the basis of a specific exemplary embodiment. This exemplary embodiment corresponds to a possible implementation in a product.

An optical flow field is initially ascertained. 6 different quality measures may be associated with each flow vector—understood as correspondence 12—and appended to the data structure of the flow vector. A priority may be computed in each case from the quality measures, as shown in conjunction with FIG. 3. In addition, further features—within the context of additional pieces of information 30, 32—may be taken into consideration, for example, a mask which is associated with an earlier point in time and identifies pixels to be excluded, as shown in conjunction with FIG. 4. A preferred selection of correspondences 12 may be derived and generated from the entirety of the pieces of information, as shown in conjunction with FIG. 5.

Several core aspects and advantages of the present invention are explained in greater detail hereafter:

A selection of a preferred subset of correspondences 12 from an entirety of provided correspondences 12 may be carried out in consideration of an arbitrary combination of the following criteria:

Uniformity: The sampling points are to be preferably distributed uniformly over image 10 or over field 10 of correspondences 12.

Instead of a uniformity in image 10, a uniformity in space may also be pursued, for example, via a constant number of correspondences per solid angle.

Still more generally—instead of a uniformity—a specific location-dependent and/or solid-angle-dependent density profile of the correspondences may be pursued.

Priority: The best correspondences 12 are preferably to be selected according to a priority.

Optional pieces of information 30, 32 may be taken into consideration in addition to the aspect of the priority or may be incorporated into the determination of the priority.

Quality measures: Different quality measures may be generated and used for existing correspondences 12, which are preferably provided in coded form and are appended to the particular correspondence or associated therewith, for example.

Combination of quality measures: Multiple existing quality measures may be combined with one another to ascertain a new quality measure or a new priority therefrom and associate it with a particular correspondence.

Compilation of quality measures: Multiple—in particular coded—quality measures may be compiled for use as an address of a lookup table (LUT) or readout table, which depicts the addresses on a scale of qualities and/or priorities.

The use of an LUT is reasonable if a finite and not excessively large number of combinations of quality measures and/or other attributes exist, so that a priority may be associated with every such combination, which may also be represented as a number. This association may be stored explicitly—and generally one time—as an LUT and retrieved again and again. This procedure may be more favorable with respect to computing time than always determining the priority from the beginning.

Training data: It is possible to generate such an LUT on the basis of training data.

Further pieces of information: The incorporation of further pieces of information is possible, these also being able to originate from other system components, methods, and/or algorithms, for example, from a video-based object classification or from a semantic segmentation based on machine learning.

The following aspects are possible:

pieces of information about the movement options of an object or an object class (for example: correspondences 12 to pedestrians could be excluded in principle as a precaution, regardless of whether the pedestrian is presently moving or not), pieces of information about the presence of properly motioned objects, in particular having a non-epipolar compliant movement, (background: If the determination of the relative orientation relates to a scene assumed to be static, all associated correspondences 12 thus are epipolar compliant, and thus relate to the same epipole.)

pieces of information in the form of binary masks or in the form of images of quality measures or priorities and/or pieces of information which are associated with an older point in time and may be transferred to a desired point in time using the optical flow (correspondences 12).

pieces of information which are associated with an older point in time and may be transferred to a desired point in time using a known proper motion.

According to the present invention, these aspects may be used to be employed in a method for selecting a preferred subset of correspondences 12 from an entirety 10 of provided correspondences 12 and in order to thus carry out a proper motion estimation of the camera with respect to its surroundings.

Quality Measures and Mapping to a Priority

To be able to ascertain a preferred subset of correspondences 12, criteria or measures have to be available, on the basis of which, for example, a priority sequence may be ascertained.

If only a single quality measure is provided, the establishment is trivial, because the quality measure or a mapping thereof, for example, reciprocal value, sign reversal, rounding, function, etc., may be used directly as a priority.

If multiple quality measures are provided, for example, a number n, it is thus reasonable to combine them suitably with one another and possibly, for example, to carry out a mapping from an n-dimensional space to the one-dimensional scale of the priorities.

As already mentioned above, quality measures (1) and (2), for example, may be appended individually to each flow vector as additional information, for example, using 2 bits per quality measure in each case.

A further quality measure could, for example, contain the piece of information of the pyramid step of a resolution pyramid in which the particular correspondence was ascertained.

In one exemplary embodiment of the present invention, for example, four further quality measures may be appended, specifically each with 1 bit or 2 bits. In total, in this exemplary embodiment therefore 6 quality measures would be provided, for example, identified by QM0 through QM5, represented by 10 bits. It is advantageous to code different quality aspects in these quality measures, which are preferably statistically independent of one another, to thus make the total information content which may be represented therein as large as possible.

FIG. 6 shows the binary layout for the coding of a flow vector or a correspondence 12 and its quality measures. The total of 32 bits are allocated into 22 bits for the actual flow vector or actual correspondence 12 itself and 10 bits for quality measures QM0 through QM5.

It is advantageous to place all quality measures in successive bits. This facilitates the direct access to subgroups or to the entirety of the quality measures, which is identified here by "QCode".

The quality measures may be combined with one another, for example, added in weighted form, multiplied, logically linked, etc. to produce a combined quality measure. The rule for the combination may be dependent on the application. For example, a first application could take into consideration all quality measures, a second application only a portion thereof, and a third application could apply different weights.

The construction of a suitable arithmetical linkage may be difficult, however, in particular if the priority generated by the linkage is to utilize a similar value range as the entirety of the original quality measures, which include 10 bits and thus a value range 0-1023 here.

One alternative is therefore the mapping using a lookup table (LUT). The combination of the quality measures to form one word, identified hereby as QCode, may be understood as an address in the LUT. Priority values which may be read out are stored at these LUT addresses.

Multiple such LUTs may be provided in a corresponding ASIC: The LUT for the priority sampling maps 10 bits on 10 bits. Further LUTs map 10 bits on fewer bits.

Instead of the use of an ASIC, alternatively or additionally in combination, freely programmable structures, for example, in a CPU or in a general digital signal processing unit, are also possible.

In one particularly advantageous specific embodiment
  the provided priority values of the LUT are all different,
    with the advantage of a reversible unique mapping, i.e., a mapping without information loss, and
  cover the same value range overall as the addresses, specifically with the advantage that the binary word length remains as short as possible.

In this exemplary embodiment, a mapping is provided in which the 10-bit address is mapped with the aid of the LUT on a 10-bit priority.

This procedure also opens up the option of carrying out more complex methods offline to find an optimum LUT, for example, on the basis of an automated training method, which is based on large quantities of data.

The result of the application of the LUT to the summary of the quality measures identified as a QCode for a flow field or an entirety of correspondences is shown in FIG. 3: The darker, more strongly shaded or contrasted a particular pixel 11 is, the higher is the priority of the flow vector ending at this point or correspondence 12 associated with this pixel. In the case of an absent flow vector or absent correspondence 12, the priority is 0, corresponding to a white pixel in the illustration.

The central image region is darker in FIG. 3 than the lateral regions on the left and right because the central region was processed in a higher location resolution, which was also reflected in the quality measures and was taken into consideration in the determination of the priority.

Uniform Sampling of Correspondences with High Priority

For many applications, it is advantageous to select the subset of correspondences 12 distributed preferably uniformly over the image. This applies in particular to the estimation of the relative orientation.

For this purpose, it would initially be obvious to lay a suitably scaled, uniform grid over the image, for example, a rectangular grid or hexagonal grid, and to carry out the sampling at the grid points, or alternatively to generate the sampling points using a quasi-random generator, which ensures a good uniform distribution.

Such a procedure would not ensure that correspondences of high priority are preferred, however.

A method is thus sought which ensures both at the same time, i.e., the best preferable uniform distribution and the preferably highest priority of the sampled correspondences.

The example method according to the present invention therefore provides for dividing image 10 into nonoverlapping partial regions 15, in other words, forming a tiling or a tessellation, and selecting, for example, first best correspondence 12 from each tile 15. FIG. 7 shows for this purpose a preferred exemplary embodiment including rectangular tiles 15 with joints offset line by line as in a masonry wall. Tiles 15 are 8 pixels wide and 4 pixels tall here and each line of tile cells is offset by half of a tile width.

Smaller tiles 17 also occur, for example, at the image margins. The tile shapes and tile sizes may also be variable, for example, smaller in the image center, if more sampling values are to be represented there than in the outer image areas.

The tile shapes may be, for example, polygonal. Non-overlapping tiles are preferred, because it is thus ensured that a correspondence may not be selected multiple times. Overlapping tiles, for example, of rectangles of variable size, are not precluded, however, since they have other advantages: For example, the determination of the association, i.e., in which tile a correspondence is located, is particularly simple in the case of rectangular shapes.

One or multiple correspondences 12, which are each provided with a priority, may be stored at each pixel 11.

Pixels 11 of a tile 15 are preferably processed in a predetermined sequence, for example, column by column from top to bottom and then from left to right, as shown in FIG. 8 by the course of arrows 19. Correspondence 13 having the highest priority within the tile is ascertained. If multiple correspondences 13 have the highest priority in tile 15, the method proceeds according to a predetermined rule, for example, the first or last correspondence having the highest priority is selected.

The desired behavior thus results, that good uniform distribution and high priority of sampled correspondences 12 are thus ensured. The computing effort for this purpose is very low at the same time.

Consideration of Further Features

In addition to the quality measures which are appended to correspondence 12, still further features may be taken into consideration.

These may be supplied, for example, as one or multiple mask(s), a mask being able to have the same size as field 10 of correspondences 12. Such a mask is shown in FIG. 4. The content of the mask may be binary or may include a larger value range.

The content of the masks may in turn be combined with the above-described priority, for example, added in weighted form, multiplied, logically linked, etc., or also incorporated from the beginning into the computation of the priority, possibly using an LUT having a correspondingly greater value range.

It may be particularly advantageous to proceed in two steps, for example, initially to perform the above-described uniform sampling and then, for example, taking into consideration one or multiple binary mask(s), to decide whether the candidate selected during the sampling is accepted or discarded. This procedure reduces the effort since the information from the masks only has to be considered for the smaller subset of sampled correspondences 12. The advantage of the lesser effort particularly comes to bear in the exemplary embodiment shown, because the computing-intensive warping described hereafter in detail remains restricted to this smaller subset.

In the exemplary embodiment shown, the mask identifies potentially properly motioned image regions, which are better to be excluded if an proper motion estimation is to be carried out on the basis of the correspondences, because the proper motion to be estimated here is to specify the relative movement between the camera and the static world and is to remain uninfluenced by other properly motioning objects.

It is therefore advantageous to recognize such properly motioned objects beforehand and identify them, for example, in a mask.

This recognition may be carried out by detection of non-epipolar compliant movement according to the illustration from FIG. 2 using connections 34 through 36. The estimated relative orientation is used, from which the epipole or the epipolar directions may be ascertained. It may thus be established for each correspondence whether it is epipolar compliant. If this is not the case, this may thus be identified accordingly, for example, on the basis of the mask. The mask thus formed may then preferably be used in a next time step or also even immediately.

For the combination of the priorities according to FIG. 3 with the mask according to FIG. 4, the exemplary embodiment would use a following solution: The selected correspondence is discarded if the underlying pixel is identified as potentially properly motioned, otherwise it is retained. Other combinations are also possible.

Further examples of pieces of information which may be taken into consideration in the form of such masks are listed hereafter:

The use of a semantic segmentation is possible, which specifies for each pixel, for example, its object class, possibly with specification of probabilities. This information may be used reasonably here, for example, to derive a measure for the "immobility" therefrom.

The greater the immobility, the better suitable the scene point is for the proper motion estimation:

For example, the immobility would be particularly high in the case of the object classes of road, curb, guardrail, traffic sign, tree, wall, building.

The immobility would be particularly low, for example, in the case of the object classes of bicyclist, pedestrian, glass surface (because of possible reflections), snowflake.

Furthermore, the masking of image parts which are to be excluded from the selection may be used: For example, it is reasonable in the case of a driver assistance camera oriented forward to exclude the area of one's own engine hood, if it is recorded by the camera. This is because it would be a significant disadvantage also to incorporate correspondence from the area of the engine hood into the proper motion estimation, since it is rigidly connected to the camera and a null movement, i.e., maximum immobility is to be expected, or it displays reflections of scene points, for example, movements, which could confuse the proper motion estimation.

Additionally or alternatively, the use of a mask of image parts, which result due to restrictions of the optical path, is also possible. For example, in the case of a wide-angle optics, there may be areas in the image corners which are not covered or are only covered inadequately by the optical system, for example, because of an excessively small image circle, for example, also because of image errors, strong aberrations, or the like, or in which interferences are to be expected due to reflections and scattered light and which should therefore better be masked out.

Time Warping of the Further Features by Optical Flow

In practice and in particular in a real-time system, one may be confronted with the problem that a required piece of information—for example, the above-mentioned masks—is not yet ready for the present point in time, but rather only in an older version for an earlier point in time.

Waiting is sometimes not possible because otherwise the latency and thus the reaction time would become excessively large or because reasons of causality indicate otherwise: In the exemplary embodiment shown, the ascertainment of the properly motioned objects is dependent on the result of the proper motion estimation. Feedback is thus provided. This is also shown in FIG. 2 on the basis of arrow 34.

In such cases, it is advantageous to transfer the information from the old mask to the desired point in time, this procedure is also referred to as warping. This is particularly advantageous because the correspondences already exist and the flow vectors indicate how scene points have moved further in the image. It may accordingly be indicated how attributes associated with the scene points have moved further.

Hereafter, 3 points in time $t_M < t_P < t_C$ are presumed:

$t_M$ is a point in time for which the information is provided, for example, in the form of a mask (M: mask), $t_P$ is an earlier point in time for the determination of correspondences 12 (P: previous), $t_C$ is a current point in time for the determination of correspondences 12 (C: current).

Correspondences 12 between points in time $t_P$ and $t_C$ should already be provided, for example, as a backward flow, i.e., in the more recent coordinates for $t_C$, and should have been sampled.

If $t_P$ is identical to $t_M$, if the mask for point in time $t_P$ is thus provided, the warping is thus particularly simple: For each sampled coordinate (x, y) at point in time $t_C$, a flow vector (u, v) is provided as correspondence 12, so that correspondence 12 having the structure (x-u, y-v) may be ascertained therefrom. The mask may be read out accordingly at this image position.

While (x, y) are normally integer pixel coordinates, this is generally not the case (subpixel component of the movement) with correspondence 12 having the correspondence vector (x-u, y-v), rounding or interpolation thus has to be carried out suitably here. Interpolation may also be understood as a majority decision, for example, on the basis of the values of the mask in a close proximity. FIG. 9 illustrates the case, which is particularly important in practice, having $t_M < t_P < t_C$. The reverse flow vectors are each shown by arrows 91, which end at the integer pixel coordinates at $t_C$ and begin at the non-integer pixel coordinates at $t_P$. Since the mask is associated with an earlier point in time $t_M < t_P$, this additional time interval should be compensated for suitably. This may be carried out at least approximately in that the particular flow vector is extended backward as correspondence 12, specifically by a factor $$s = (t_C - t_M)/(t_C - t_P) \tag{1}$$

The access to the mask should thus take place accordingly at the point (x-s·u, y-s·v), suitable rounding or interpolation also possibly being required here. The extension is identified in each case by arrow 92 in FIG. 9.

This approach is based on the assumption that movement direction and movement velocity are at least temporarily approximately constant (inertia assumption), which is usually met sufficiently well in practice.

The exemplary embodiment described here relates to a (sampled) reverse flow between points in time $t_P$ and $t_C$.

Other variants are also possible, for example, the additional usage of a reverse flow between points in time $t_M$ and $t_P$, if present. This approach is more accurate and the inertia assumption is not necessary, however, the effort is greater, since the information contained in the mask has to be transported further in two steps: Initially, a position in image $t_P$ is ascertained using the newer flow vector between $t_P$ and $t_C$. The older flow vector between $t_P$ and $t_M$ is read out there—possibly after suitable rounding or interpolation. A position in the mask is thus ascertained which is finally read out, suitable rounding or interpolation also possibly being required here.

Variants using forward flow are also possible, and also variants in which both forward flow and reverse flow may be utilized.

Final Result and Usage

The final result for the exemplary embodiment may be seen in FIG. 5. The sampling positions are shown here. These sampling positions are distributed uniformly over image 10. Due to the offset of the tile cells and the side ratio of tiles 15, an approximately hexagonal sampling pattern results. Nonetheless, the priorities are always maximal in the particular tile.

Potentially properly motioned objects are excluded according to the mask propagated with the aid of warping, which may be apparent from the cut-out pedestrians. Correspondences 12 thus selected are thus particularly well suited for an proper motion estimation. The priority values may optionally be relayed to the algorithm for the proper motion estimation. This algorithm may take the priorities into consideration, for example, convert them into weights, using which the particular correspondences are incorporated into the estimation.

FIG. 2 shows a block diagram for a possible sequence. First and second image B1 and B2 may originate from different cameras or from the same camera. Dashed lines stand for optional components. Connections 34 through 36 stand for the described acquisition and consideration of pieces of information about properly motioned objects, to preferably exclude their correspondences during the estimation of the relative orientation.

FIG. 3 shows that a priority is associated with every flow vector and/or every correspondence 12. The priorities are represented by different point densities, the higher the point density, the higher the priority is.

Pixels or areas for which no correspondence may be determined also exist in FIG. 3. These pixels or areas are shown as white, which corresponds to the priority 0 or invalid.

FIG. 4 makes it clear that in addition to the priority, further features may be taken into consideration, for example, a mask for a point in time $t_M$, which identifies potentially nonstatic regions, for example, due to properly motioned objects, which are shown with a white center.

FIG. 5 shows a result of the priority sampling according to the present invention, specifically in consideration of potential nonstatic regions. The selected sampling positions are shown as black, at which the preferred correspondences are located.

FIG. 6 shows an example of the bit layout of a flow vector and its quality features. Of a total of 32 bits, 22 bits are provided for the flow vector or for correspondence 12 itself and 10 bits are provided for additional information, which contains individual quality features each at 1 bit or 2 bits here (QM0 through QM5), which may also be considered jointly (QCode), for example, as an address for a lookup table.

FIG. 7 shows an example of the division of an image 10 having pixels 11 and possibly correspondences 12 into tiles 15. Tiles 15 are eight pixels wide and four pixels tall here.

The tile cells are offset horizontally in relation to one another here as in a masonry wall. If flow vectors are provided in tile 15, for example, one preferred flow vector or one preferred correspondence 13 is selected per tile 15, marked here by a circle. Tiles 15 also exist in which no flow vector 11 is provided, specifically according to shaded tiles 15 additionally identified by 16.

FIG. 8 shows that in a tile 15, pixels 11, with each of which one or more correspondences may be associated, are processed in a predetermined sequence, for example, beginning at the top left, preferably column by column, then from left to right.

FIG. 9 shows that in the normal case the mask—here MOM, moving objects mask—is associated with an earlier point in time $t_M < t_P < t_C$ than the two images between which the optical flow is determined (points in time $t_P$ and $t_C$). This time offset between $t_M$ and $t_P$ may be compensated for, however, for example, by reverse extension 92 of flow vector 91 with the factor $s=(t_C-t_M)/(t_C-t_P)$ and reading of the mask at the corresponding point.

The binary format of a flow vector 12 and its quality features 22 may be constructed according to the illustration in FIG. 6. The format may be openly visible and transfers may take place continuously from fields of correspondences between an underlying ASIC and a memory. For the mapping of the quality features with the aid of a 10-bit QCode in a priority, the user may program in, for example, an LUT or readout table, which is stored via a driver in registers. Binary masks may also be stored in a memory and input at the correct moment and are then possibly visible accordingly. The result of the priority sampling may in turn be stored as a list and may also be visible.

A corresponding ASIC may be provided, for example, for driver assistance systems. Alternatively or additionally, the functions described according to the present invention or parts thereof may be implemented to be freely programmable, for example, in conjunction with a CPU or a general digital signal processor.

What is claimed is:

1. A method for evaluating correspondences of images, comprising:
   providing a plurality of correspondences between provided first and second images;
   providing a plurality of quality measures as attributes for characterizing a particular correspondence of the plurality of correspondences, a respective quality measure of the plurality of quality measures, as an attribute of an observed correspondence, being representative of a measure of a clarity with which the particular correspondence was ascertained in a local surroundings, and a measure of a consistency of the particular correspondence with a temporally preceding correspondence with regard to a measure of consistency of flow vectors over time, upon confirmed consistency, an underlying temporally stable behavior being specified as a numeric value in a form of an age;
   evaluating and conditionally selecting correspondences of the plurality of correspondences, wherein the evaluation of the correspondences is based on a combination of the attributes, and the selection of the correspondences is based on a result of the evaluation; and
   providing the selected correspondences as an evaluation result,
   wherein attributes and/or quality measures for correspondences of an earlier point in time are transferred and/or extrapolated to a correspondence at a later point in time.

2. The method as recited in claim 1, wherein a particular quality measure, as an attribute of an observed correspondence, is representative of at least one:
- a measure of an at least local location dependence and/or solid angle dependence of a distribution of the correspondences at least in an area of the particular observed correspondence, the measure including a measure of a uniformity of a location-dependent and/or solid-angle-dependent distribution of the correspondences,
- a measure of a priority for a preferred consideration of an underlying correspondence,
- a measure of a presence of a correct association of the particular correspondence with areas of the underlying images,
- a measure of a proper motion of areas, which are related to the particular correspondence, of underlying images, in particular an object related to the underlying mages and/or in consideration of non-epipolar compliant movements,
- a measure of a movement possibility of the areas, which are related to the particular correspondence, of the underlying images, in particular an object related to the areas,
- a measure of an accuracy with which the particular correspondence was determined,
- a measure of an underlying resolution or resolution step in an ascertainment of the particular correspondence,
- a measure of an association of the areas, which are related to the particular correspondence, of the underlying images, in particular an object related to the areas, with a semantic class, on the basis of a video-based object classification, and/or a procedure of machine learning, and/or a procedure of semantic segmenting,
- a measure of an association of the areas, which are related to the particular correspondence, of the underlying images, in particular an object related to the areas, with a class for consideration of permitted areas of the underlying images, in conjunction with masking.

3. The method as recited in claim 1, wherein combined quality measures are used as the attributes, which are derived from one or more quality measures by combination formation and/or function formation, the function formal including reciprocal value formation, or sign reversal, or rounding, or formation of functional values of underlying scalar or vectorial values of the quality measures.

4. The method as recited in claim 1, wherein values of a particular attribute and/or values of the plurality quality measures, are used coded as an address for utilization, in conjunction with a readout table representing values of the attributes and/or values of the quality measures.

5. The method as recited in claim 1, wherein:
- the particular correspondence is represented as a one-dimensional list or as a vector, and
- a particular attribute associated with the correspondence and/or a coding of the particular attribute, is represented as one or more additional list elements or vector components or as parts of the additional list elements or vector components, and is appended to the list or the vector.

6. The method as recited in claim 1, wherein:
- the correspondences in combination with the associated attributes are represented as an image or matrix,
- the image or the matrix is covered by overlapping and/or non-overlapping partial regions, and
- a best correspondence with respect to the associated attributes is selected for each of the partial regions in regard to the correspondences present in the partial region.

7. An operating assistance method, the method comprising:
- recording images;
- evaluating correspondences of the images, including:
  - providing a plurality of correspondences between provided first and second images of the images,
  - providing a plurality of quality measures as attributes for characterizing a particular correspondence of the plurality of correspondences, a respective quality measure of the plurality of quality measures, as an attribute of an observed correspondence, being representative of a measure of a clarity with which the particular correspondence was ascertained in a local surroundings, and a measure of a consistency of the particular correspondence with a temporally preceding correspondence with regard to a measure of consistency of flow vectors over time, upon confirmed consistency, an underlying temporally stable behavior being specified as a numeric value in a form of an age,
  - evaluating and conditionally selecting correspondences of the plurality of correspondences, wherein the evaluation of the correspondences is based on a combination of the attributes, and the selection of the correspondences is based on a result of the evaluation, and
  - providing the selected correspondences as an evaluation result; and
- controlling operation of the device using the evaluation result,
wherein attributes and/or quality measures for correspondences of an earlier point in time are transferred and/or extrapolated to a correspondence at a later point in time.

8. The operating assistance method as recited in claim 7, wherein the operating assistance method is a driving assistance method, and the device is a vehicle.

9. A device for evaluating correspondences of images, the device configured to:
- provide a plurality of correspondences between provided first and second images;
- provide a plurality of quality measures as attributes for characterizing a particular correspondence of the plurality of correspondences, a respective quality measure of the plurality of quality measures, as an attribute of an observed correspondence, being representative of a measure of a clarity with which the particular correspondence was ascertained in a local surroundings, and a measure of a consistency of the particular correspondence with a temporally preceding correspondence with regard to a measure of consistency of flow vectors over time, upon confirmed consistency, an underlying temporally stable behavior being specified as a numeric value in a form of an age;
- evaluate and conditionally select correspondences of the plurality of correspondences, wherein the evaluation of the correspondences is based on a combination of the attributes, and the selection of the correspondences is based on a result of the evaluation; and
- provide the selected correspondences as an evaluation result;

wherein the device is an ASIC, or a freely programmable digital signal processing device, or as a combination of the ASIC and the freely programmable digital signal processing device, wherein attributes and/or quality measures for correspondences of an earlier point in time are transferred and/or extrapolated to a correspondence at a later point in time.

10. An operating device, comprising:

a device for evaluating correspondences of images, the device configured to:

provide a plurality of correspondences between provided first and second images, provide a plurality of quality measures as attributes for characterizing a particular correspondence of the plurality of correspondences, a respective quality measure of the plurality of quality measures, as an attribute of an observed correspondence, being representative of a measure of a clarity with which the particular correspondence was ascertained in a local surroundings, and a measure of a consistency of the particular correspondence with a temporally preceding correspondence with regard to a measure of consistency of flow vectors over time, upon confirmed consistency, an underlying temporally stable behavior being specified as a numeric value in a form of an age, evaluate and conditionally select correspondences of the plurality of correspondences, wherein the evaluation of the correspondences is based on a combination of the attributes, and the selection of the correspondences is based on a result of the evaluation, and provide the selected correspondences as an evaluation result;

wherein the device is an ASIC, or a freely programmable digital signal processing device, or as a combination of the ASIC and the freely programmable digital signal processing device; and wherein the operating device is controlled using the device, wherein attributes and/or quality measures for correspondences of an earlier point in time are transferred and/or extrapolated to a correspondence at a later point in time.

11. The operating device as recited in claim 10, wherein the operating device is a vehicle.

12. A non-transitory machine-readable storage medium on which is stored a computer from for evaluating correspondences of images, the computer program, when executed by a computer or a digital signal processing device, causing the computer or the digital signal processing device to perform the following steps:

providing a plurality of correspondences between provided first and second images;

providing a plurality of quality measures as attributes for characterizing a particular correspondence of the plurality of correspondences, a respective quality measure of the plurality of quality measures, as an attribute of an observed correspondence, being representative of a measure of a clarity with which the particular correspondence was ascertained in a local surroundings, and a measure of a consistency of the particular correspondence with a temporally preceding correspondence with regard to a measure of consistency of flow vectors over time, upon confirmed consistency, an underlying temporally stable behavior being specified as a numeric value in the form of an age;

evaluating and conditionally selecting correspondences of the plurality of correspondences, wherein the evaluation of the correspondences is based on a combination of the attributes, and the selection of the correspondences is based on a result of the evaluation; and providing the selected correspondences as an evaluation result, wherein attributes and/or quality measures for correspondences of an earlier point in time are transferred and/or extrapolated to a correspondence at a later point in time.

* * * * *